United States Patent
Kim

(10) Patent No.: US 10,572,084 B2
(45) Date of Patent: Feb. 25, 2020

(54) TOUCH TYPE DISTINGUISHING METHOD AND TOUCH INPUT DEVICE PERFORMING THE SAME

(71) Applicant: HiDeep Inc., Gyeonggi-do (KR)

(72) Inventor: Seyeob Kim, Gyeonggi-do (KR)

(73) Assignee: HIDEEP INC. (KR)

( * ) Notice: Subject to any disclaimer, the term of this patent is extended or adjusted under 35 U.S.C. 154(b) by 0 days.

(21) Appl. No.: 15/924,712

(22) Filed: Mar. 19, 2018

(65) Prior Publication Data

US 2018/0275796 A1 Sep. 27, 2018

(30) Foreign Application Priority Data

Mar. 20, 2017 (KR) .................. 10 2017 0034501

(51) Int. Cl.
| G06F 3/044 | (2006.01) |
|---|---|
| G06F 3/041 | (2006.01) |
| G06F 21/31 | (2013.01) |
| G06F 21/32 | (2013.01) |

(52) U.S. Cl.
CPC ............ G06F 3/044 (2013.01); G06F 3/0414 (2013.01); G06F 3/0416 (2013.01); G06F 21/316 (2013.01); G06F 21/32 (2013.01)

(58) Field of Classification Search
CPC ....... G06F 21/316; G06F 21/32; G06F 3/0414
See application file for complete search history.

(56) References Cited

U.S. PATENT DOCUMENTS

| 9,639,204 B2 | 5/2017 | Kim et al. |
|---|---|---|
| 2016/0011767 A1 | 1/2016 | Jung et al. |
| 2016/0357297 A1 | 12/2016 | Picciotto et al. |
| 2016/0371691 A1* | 12/2016 | Kang .................. G06F 3/04842 |
| 2017/0052630 A1 | 2/2017 | Kim et al. |
| 2017/0083045 A1* | 3/2017 | Shim ...................... G06F 1/163 |

FOREIGN PATENT DOCUMENTS

| EP | 3054381 | 8/2016 |
|---|---|---|
| EP | 3133473 | 2/2017 |
| KR | 1020150134664 | 12/2015 |
| KR | 1020160071887 | 6/2016 |
| KR | 1020170004258 | 1/2017 |
| WO | 2016195934 | 12/2016 |

OTHER PUBLICATIONS

Japanese Office Action for related Application No. 2018-049097, dated Dec. 11, 2018.
Corresponding Korean Office Action issued by the KIPO dated Apr. 4, 2018.
European Search Report issued in corresponding EP Application No. 18162565.8, dated Jul. 4, 2018.

* cited by examiner

*Primary Examiner* — Chun-Nan Lin
(74) *Attorney, Agent, or Firm* — The Belles Group, P.C.

(57) ABSTRACT

A touch type distinguishing method in a touch input device including a touch screen may be provided that includes an authentication touch determination step of determining whether or not a time period for which a touch on the touch screen maintains the satisfaction of a predetermined condition is equal to or greater than a predetermined reference time period; and a touch type determination step of determining a touch type in accordance with whether or not the touch satisfies a predetermined condition, and a time period for which the touch is maintained.

16 Claims, 14 Drawing Sheets

【Fig. 1】
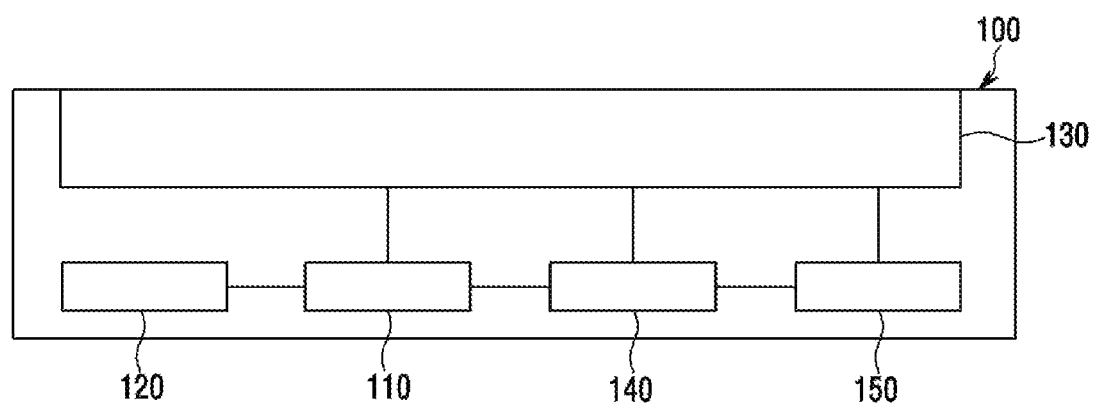
【Fig. 2a】
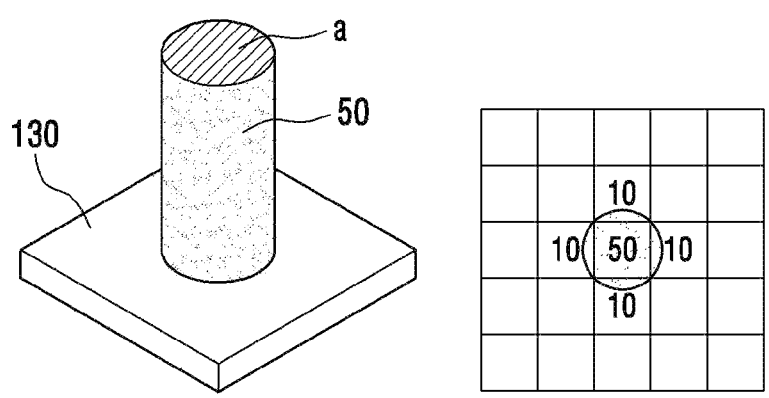

[Fig. 2b]
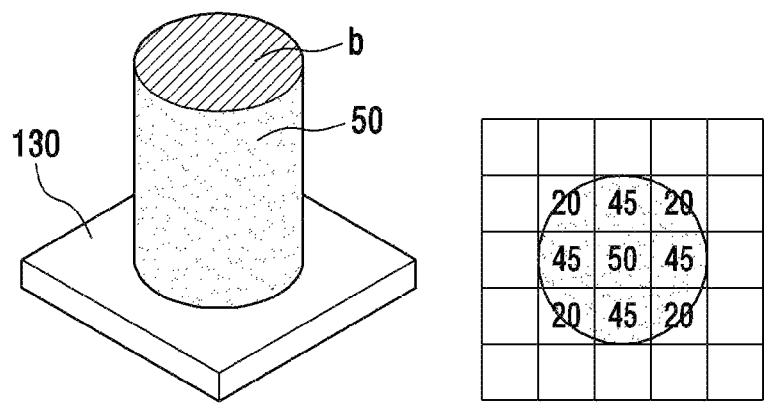
[Fig. 3a]
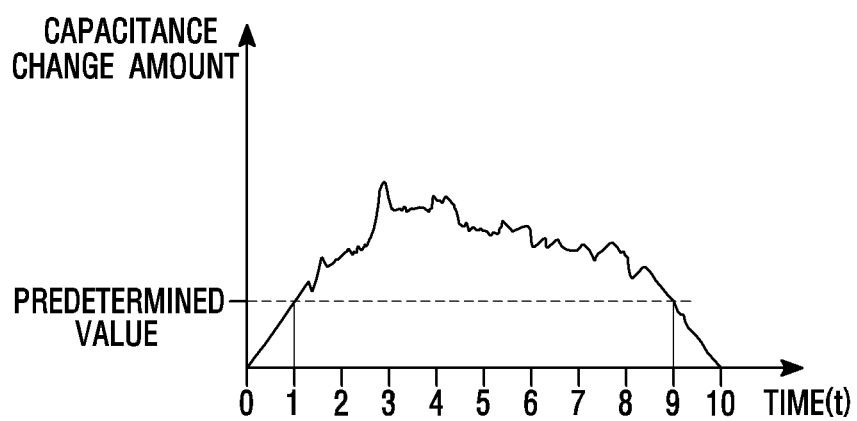
[Fig. 3b]
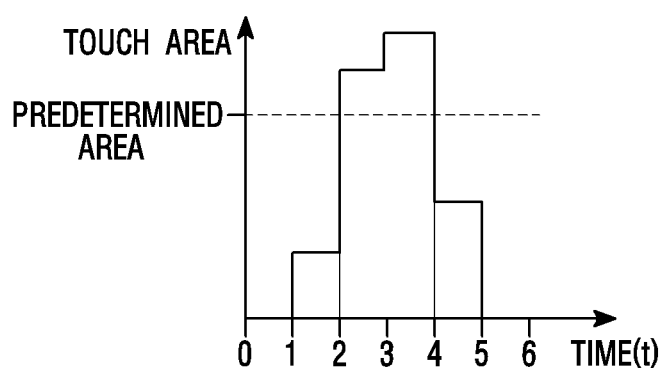

[Fig. 4a]
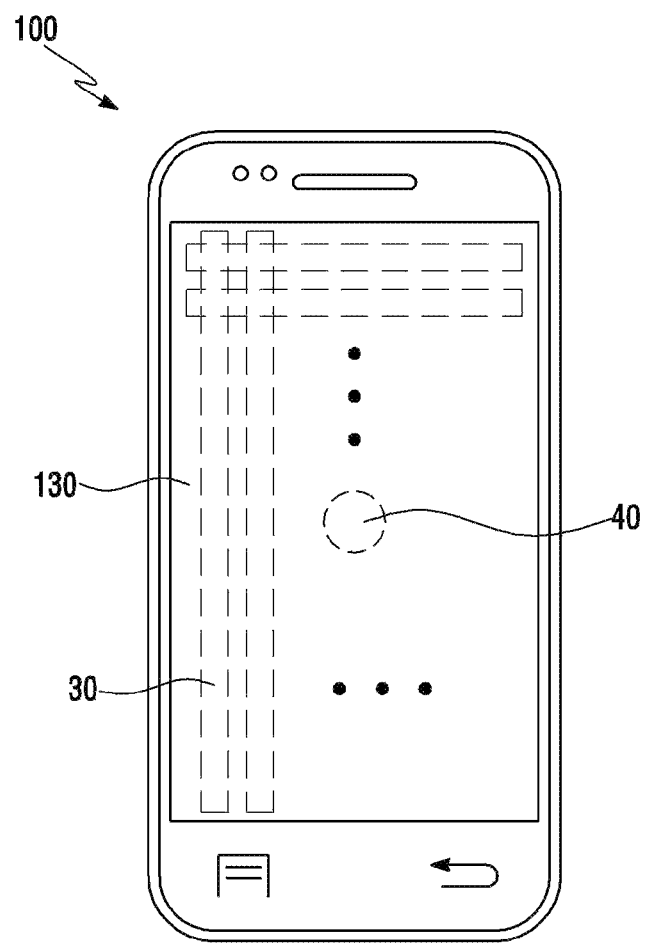

[Fig. 4b]
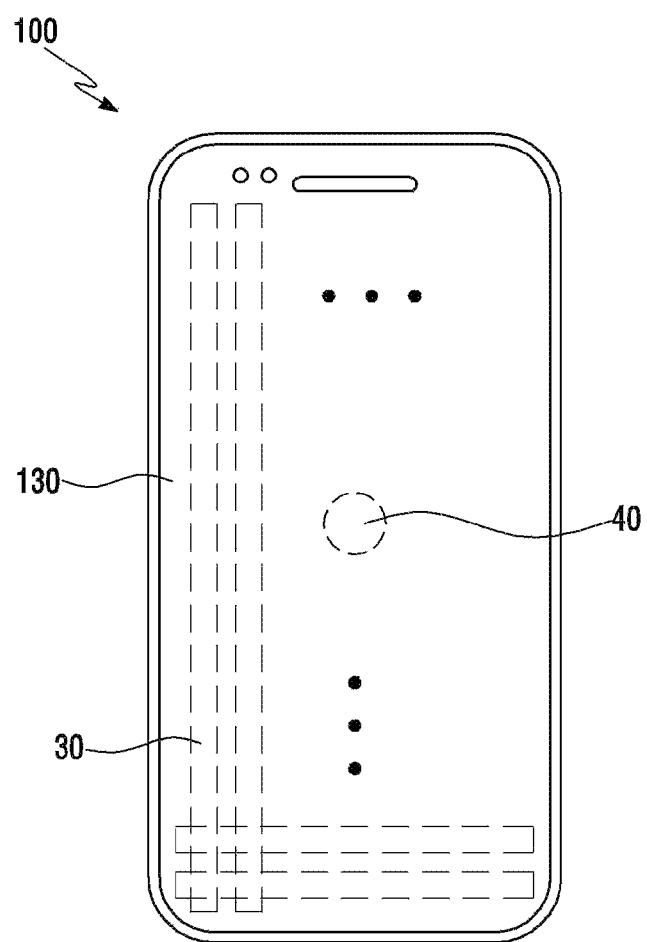

[Fig. 4c]
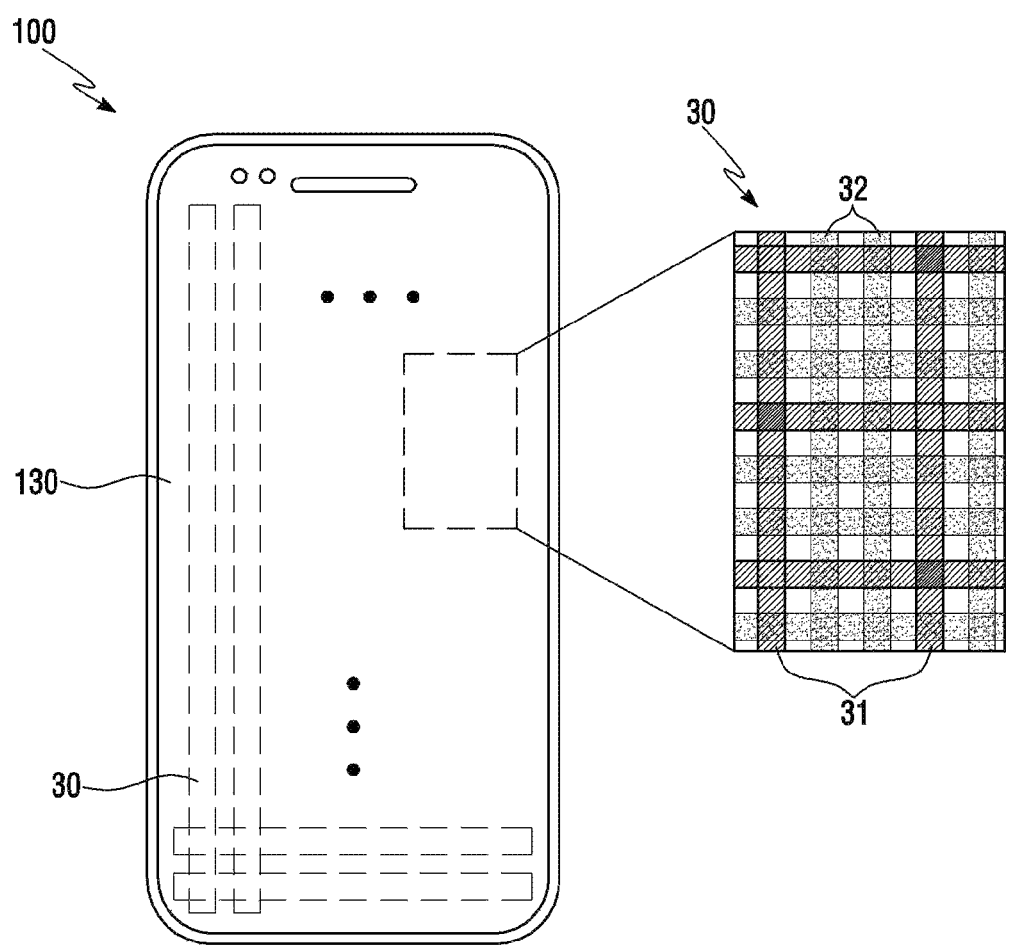

[Fig. 5]
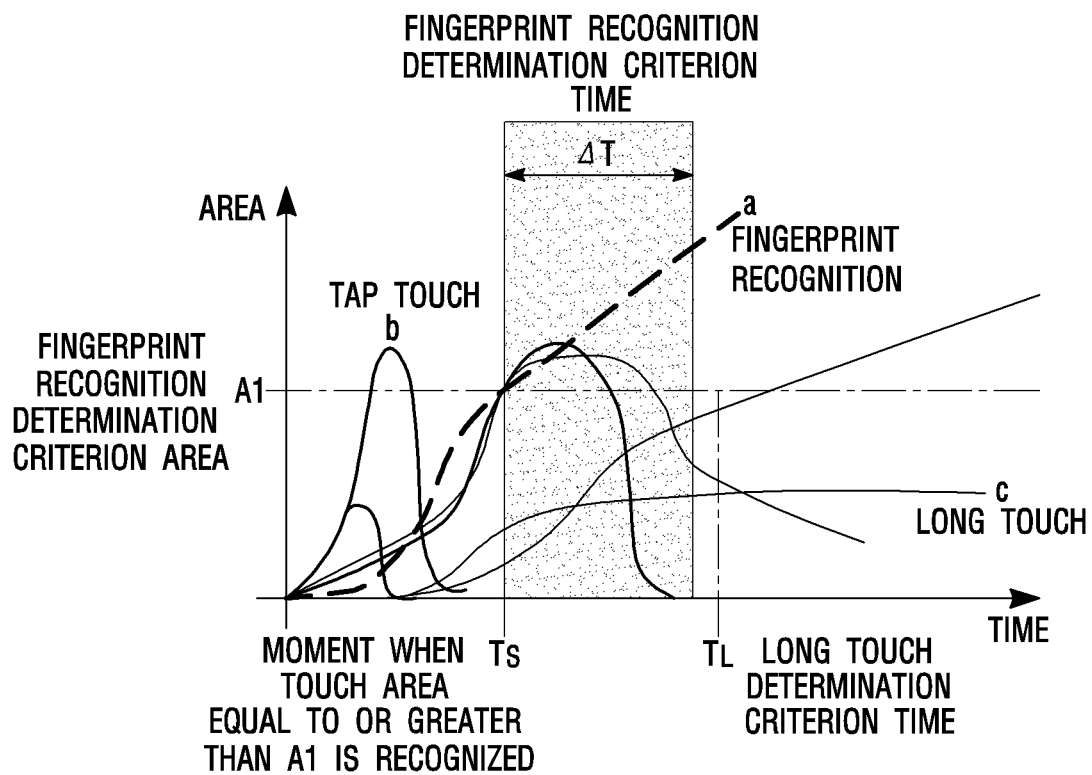

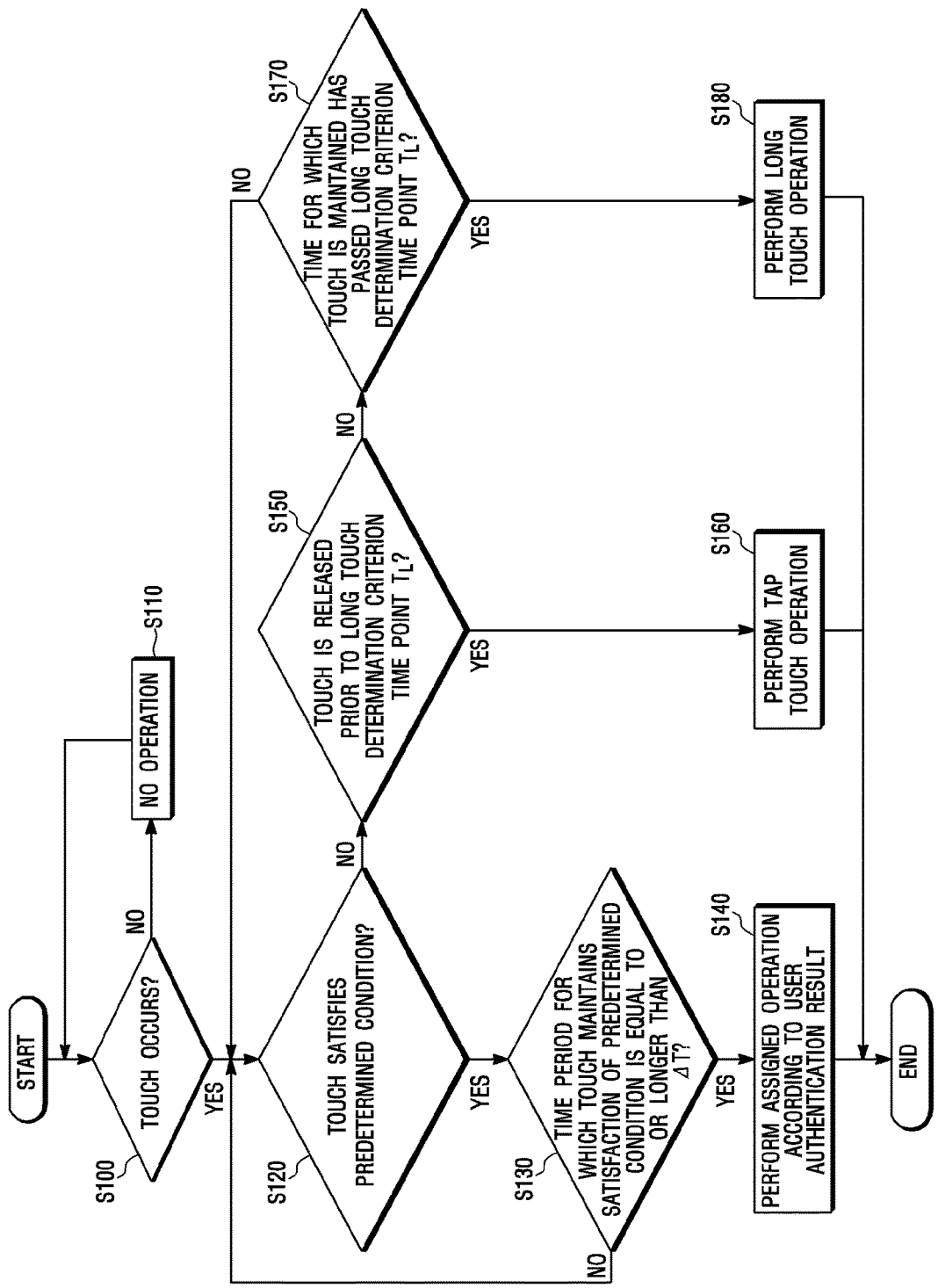
[Fig. 6]

[Fig. 7a]
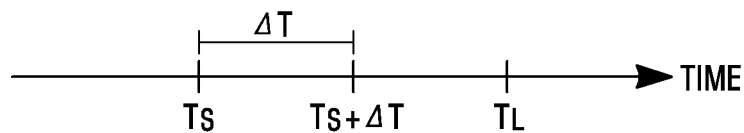
[Fig. 7b]
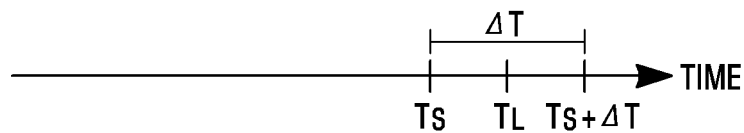
[Fig. 7c]
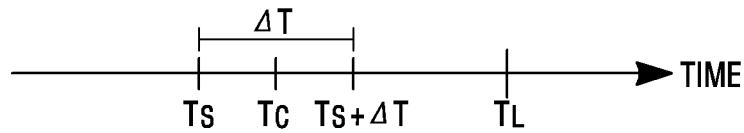
[Fig. 7d]
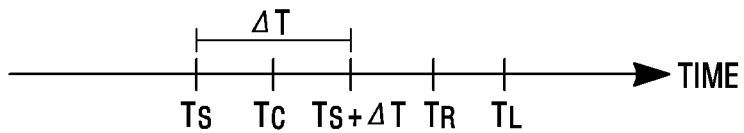

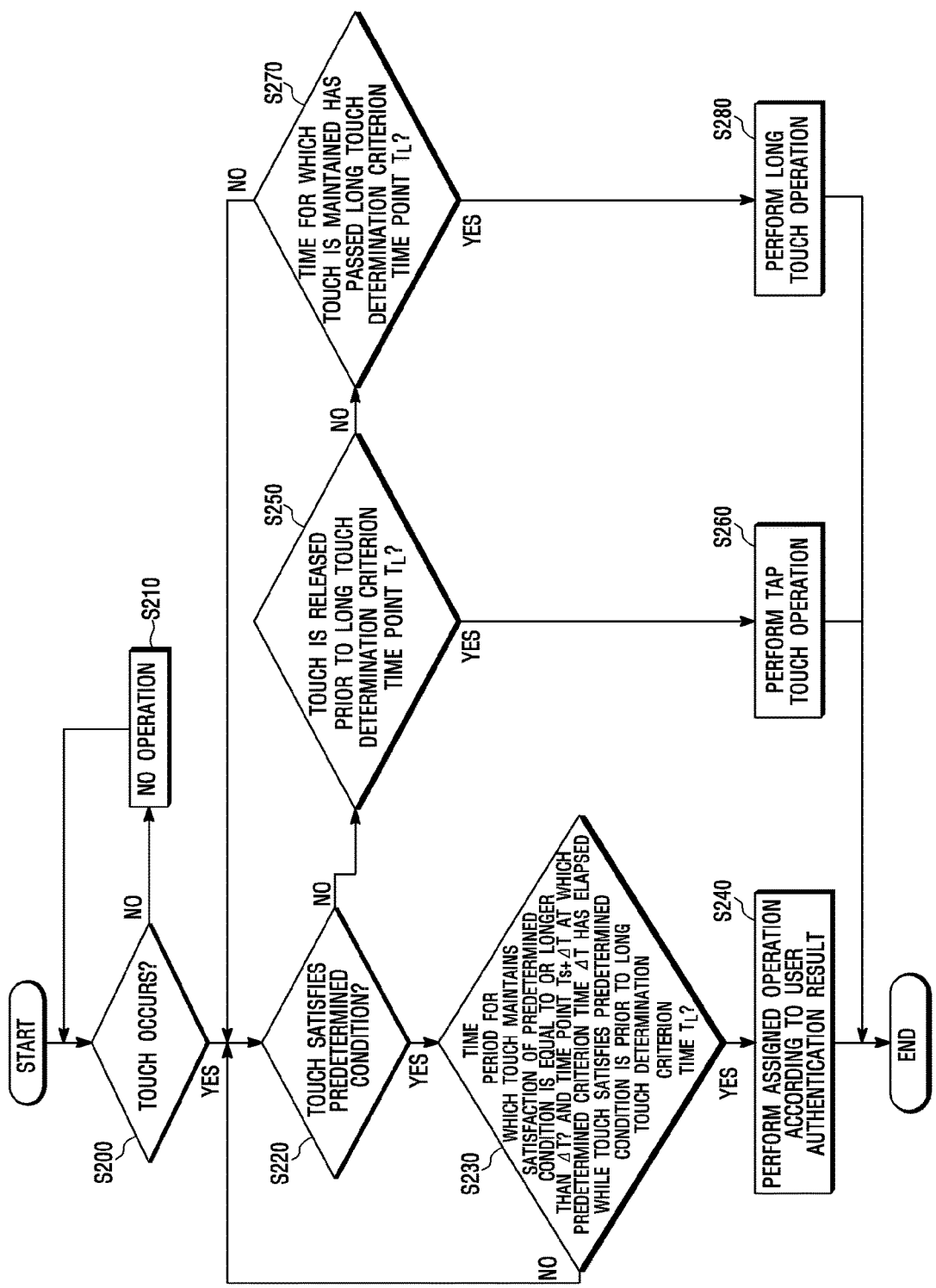
[Fig. 8]

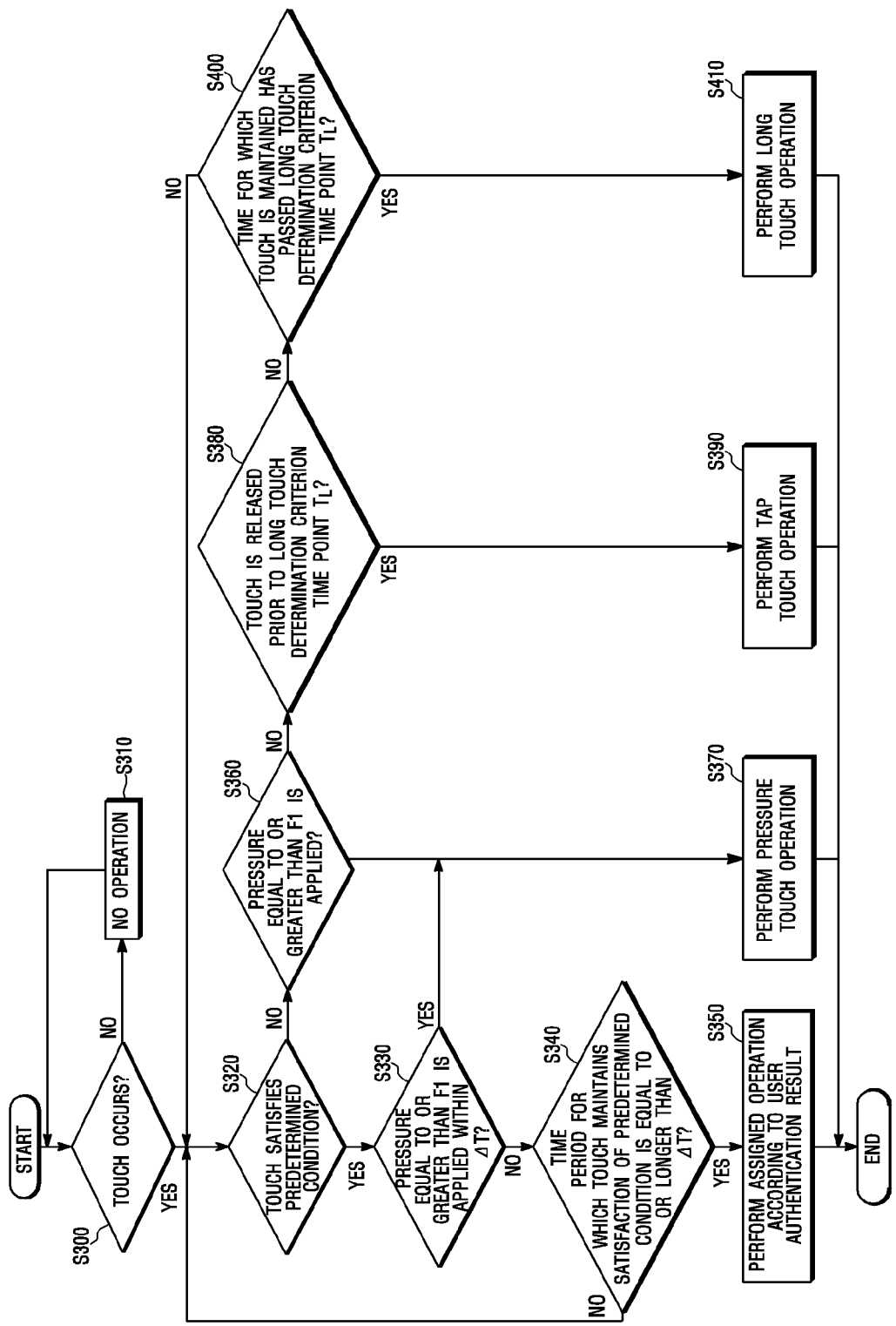
[Fig. 9]

[Fig. 10a]
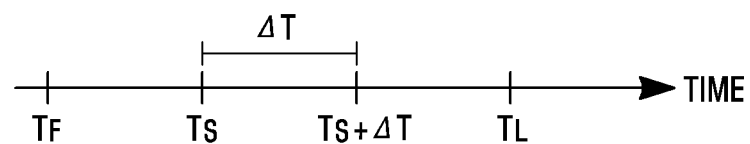
[Fig. 10b]
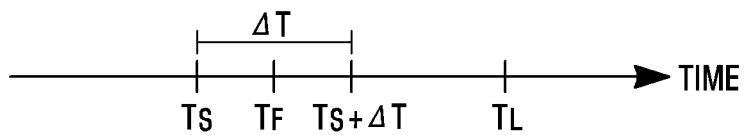
[Fig. 10c]
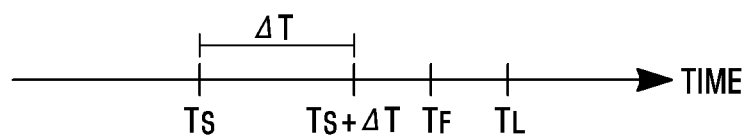

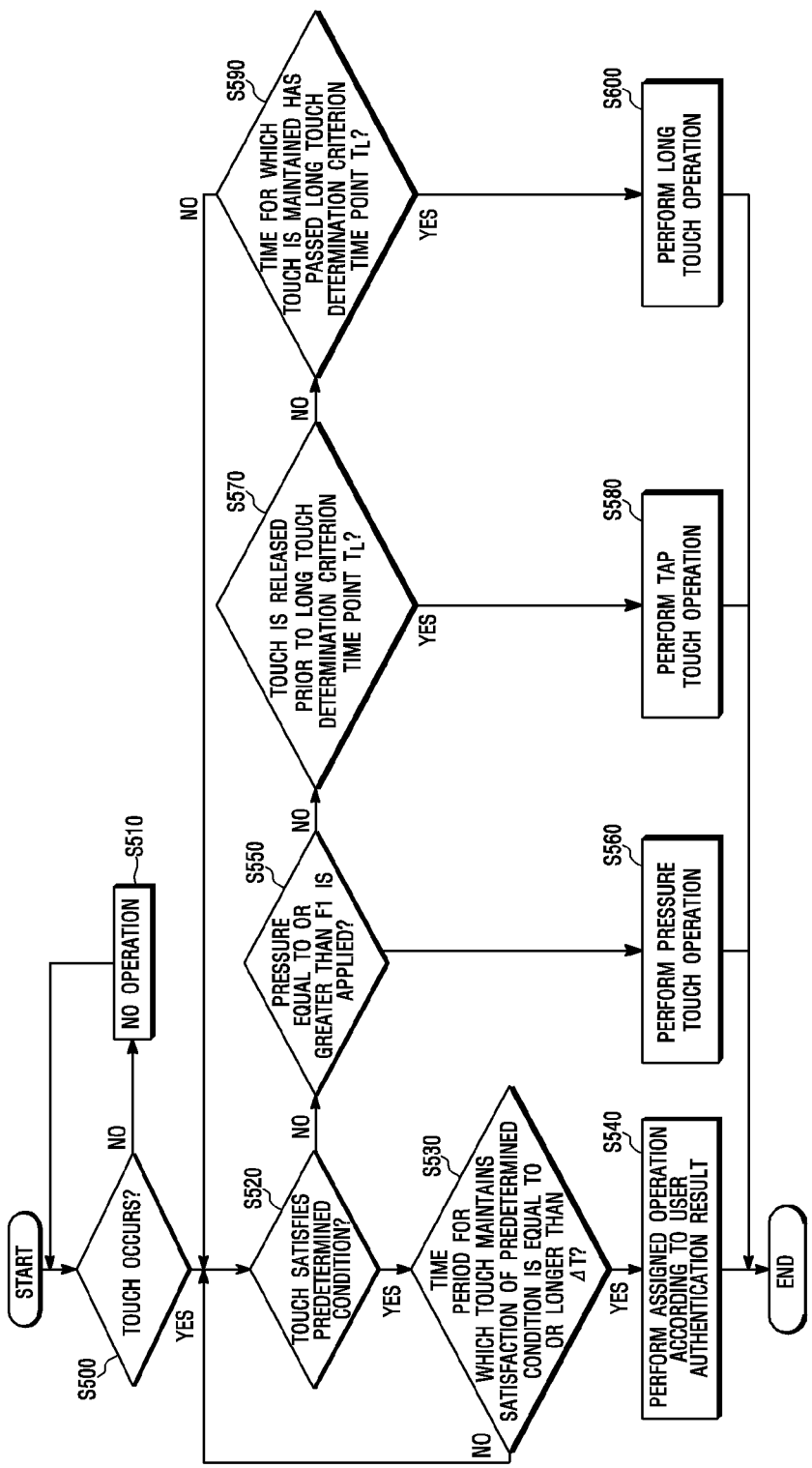
[Fig. 11]

[Fig. 12a]
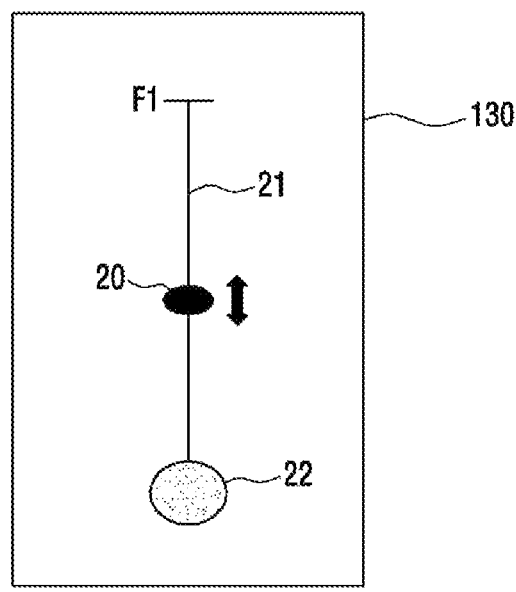
[Fig. 12b]
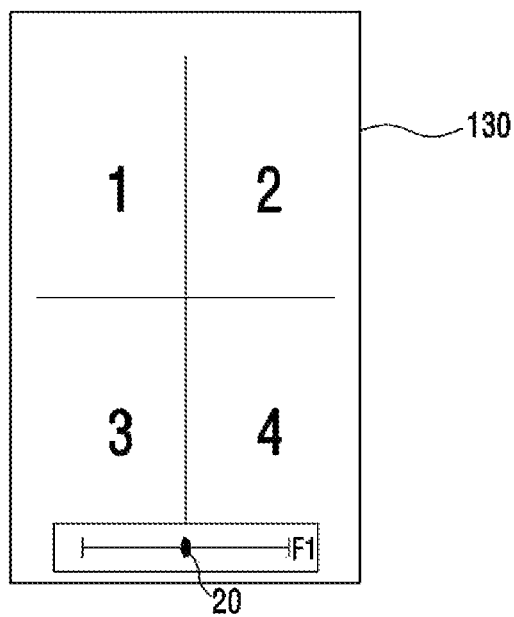

[Fig. 13a]
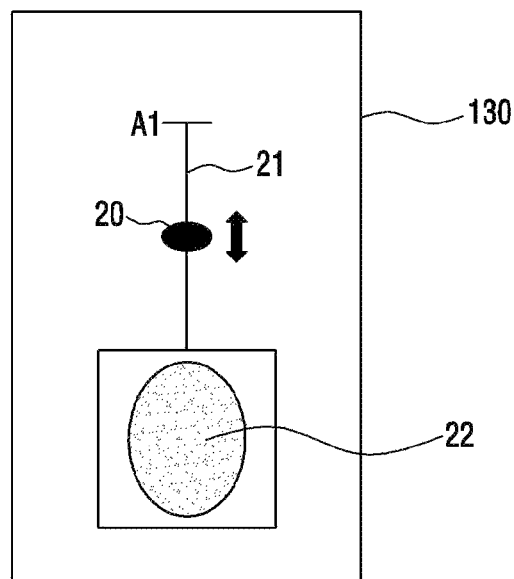
[Fig. 13b]
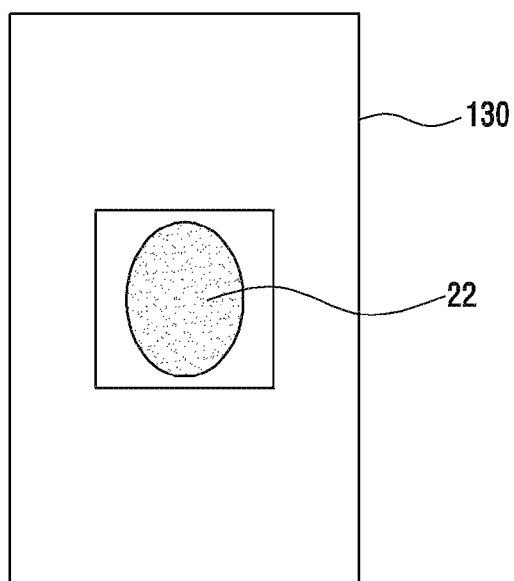

TOUCH TYPE DISTINGUISHING METHOD AND TOUCH INPUT DEVICE PERFORMING THE SAME

CROSS REFERENCE TO RELATED APPLICATIONS

Priority is claimed under 35 U.S.C. § 119 to Korean Patent Application No. 10-2017-0034501, filed Mar. 20, 2017, the disclosure of which is incorporated herein by reference in its entirety.

BACKGROUND

Field

The present disclosure relates to a touch type distinguishing method and a touch input device performing the same and more particularly to a technology for clarifying a determination criterion for a long touch and an authentication touch in one touch input device, thereby solving problems caused by confusion between the two touches.

Description of the Related Art

Various kinds of input devices are being used to operate a computing system. For example, the input device includes a button, key, joystick and touch screen. Since the touch screen is easy and simple to operate, the touch screen is increasingly being used in operation of the computing system.

The touch screen including a transparent panel with a touch-sensitive surface and a touch sensor as a touch input means can constitute a touch surface of a touch input device. The touch sensor is attached to the front side of a display screen, so that the touch-sensitive surface may cover the visible side of the display screen. A user is allowed to operate the computing system by simply touching the screen by a finger, etc. Generally, the computing system recognizes the touch and a position of the touch on the touch screen, and analyzes the touch, thereby performing operations accordingly.

In the touch input device including the touch screen, a variety of tasks can be done by the interaction between the user and the device through the touch screen. In order to perform various tasks, there is a need to distinguish between a simple touch, a long time touch, a force touch having a different input value according to the magnitude of the pressure, and an authentication touch for user authentication.

BRIEF SUMMARY

One embodiment is a touch type distinguishing method in a touch input device including a touch screen. The method includes: a step of determining whether a touch on the touch screen satisfies a predetermined condition or not; and a touch type determination step of determining a touch type in accordance with whether or not the touch satisfies a predetermined condition, and a time period for which the touch is maintained.

Another embodiment is a touch input device capable of distinguishing touch types. The touch input device includes: a touch screen; a touch controller; and a processor. The controller transmits, to the processor, at least one of a touch position, a touch area, and a touch pressure of a touch input to the touch screen, and a change amount in electrical characteristics by the touch. The processor uses at least one of the touch position, touch area, touch pressure, and change amount in electrical characteristics, which are transmitted from the touch controller, and thus, determines whether the touch satisfies a predetermined condition or not, calculates a time period for which the touch is maintained, and determines touch types in accordance with whether or not the touch satisfies the predetermined condition, and the time period for which the touch is maintained.

BRIEF DESCRIPTION OF THE DRAWINGS

FIG. 1 is a structure view of a touch input device according to an embodiment of the present invention FIGS. 2a and 2b are views for describing a change amount in electrical characteristics due to a touch;

FIGS. 3a and 3b are views for describing a touch time period;

FIGS. 4a to 4c are views for describing types in which various sensors are arranged in the touch input device according to the embodiment of the present invention;

FIG. 5 is a graph showing touch types which are distinguished by a method for distinguishing between a long touch and an authentication touch in accordance with the embodiment of the present invention;

FIG. 6 is a flowchart showing the method for distinguishing between the long touch and the authentication touch in accordance with the embodiment of the present invention;

FIGS. 7a to 7d are graphs for describing various time points at which the long touch and the authentication touch occur according to the embodiment of the present invention;

FIG. 8 is a flowchart showing another method for distinguishing between the long touch and the authentication touch in accordance with the embodiment of the present invention;

FIG. 9 is a flowchart showing a method for distinguishing between the long touch, the force touch, and the authentication touch in accordance with the embodiment of the present invention;

FIGS. 10a to 10c are graphs for describing various time points at which the long touch, the force touch, and the authentication touch occur according to the embodiment of the present invention;

FIG. 11 is a flowchart showing another method for distinguishing between the long touch, the force touch, and the authentication touch in accordance with the embodiment of the present invention;

FIGS. 12a and 12b show a method for adjusting a criterion for distinguishing the force touch in the touch input device according to the embodiment of the present invention; and FIGS. 13a and 13b show a method for setting a predetermined criterion for the authentication touch in the touch input device according to the embodiment of the present invention.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Similar reference numerals in the drawings designate the same or similar functions in many aspects.

Hereinafter, a touch input device 100 including a touch screen 130 in accordance with an embodiment of the present invention will be described with reference to the accompanying drawings.

FIG. 1 is a structure view of the touch input device 100 according to an embodiment of the present invention. The touch input device 100 according to the embodiment of the present invention may include a touch controller 110, the touch screen 130, a processor 140, and a user authentication controller 150.

Input to the touch input device 100 may be performed by touching the touch screen 130. The touch input device 100 according to the embodiment of the present invention may be a portable electronic device like a laptop, a personal digital assistant (PDA) and a smartphone. Also, the touch input device 100 according to the embodiment of the present invention may be a non-portable electronic device like a desktop computer, a smart television.

The touch screen 130 according to the embodiment of the present invention allows a user to operate a computing system by touching the screen with an object like a finger. In general, a sensor capable of sensing a touch input is disposed in the touch screen 130, and the computing system analyzes the touch and performs operations in accordance with the analysis.

The touch controller 110 according to the embodiment of the present invention can detect whether a touch occurs or not on the touch screen and a touch position when the touch occurs on the touch screen 130. Also, the touch controller 110 can measure electrical characteristics occurring according to the touch when the touch occurs on the touch screen 130. Hereinafter, the electrical characteristics may be capacitance or resistance.

FIGS. 2a and 2b are views for describing a change amount in the electrical characteristics due to the touch. Specifically, through a touch sensor disposed in the touch input device 100, the touch controller 110 can measure the electrical characteristics which change according to the approach of an object 50 to the touch screen 130 and can calculate the touch position from the measured change amount of the electrical characteristics. For example, shown in FIG. 2a, a position at which the largest change amount in the electrical characteristics due to the approach of the object 50 to the touch screen 130 appears, that is to say, the position of '50' in FIG. 2a can be calculated as the touch position.

Also, the touch controller 110 measures the change amount in the electrical characteristics which changes according to the approach of the object 50 to the touch screen 130, thereby calculating a touch area from the measured change amount in the electrical characteristics. For example, assuming that the touch input device recognizes that the touch occurs when the size of the change amount in the electrical characteristics is 20 or more, when the area of the object 50 touching the touch screen 130 is "a", the touch area, that is to say, the number of cells in which the size of the change amount in the electrical characteristics is 20 or more, may be 1. Also, when the area of the object 50 touching the touch screen 130 increases from "a" to "b" (b>a) as shown in FIG. 2b, the touch area may be 9.

As described above, the touch controller 110 can detect whether the touch occurs or not and the touch position and/or calculate the touch area, on the basis of the change amount in the electrical characteristics detected by the touch sensor.

The touch controller 110 may transmit the touch position calculated from the measured change amount in the electrical characteristics to the processor 140. Further, the touch controller 110 may also transmit the touch area calculated from the measured change amount in the electrical characteristics to the processor 140. Further, the touch controller 110 may also transmit the measured change amount in the electrical characteristics to the processor 140.

Although it has been described above that the touch controller 110 calculates the touch area and transmits to the processor 140, the processor 140 can also calculate the touch area. For example, the processor 140 can calculate the touch area by using the change amount in the electrical characteristics transmitted from the touch controller 110. Specifically, on the basis of information on the change amount in the electrical characteristics shown in FIG. 2a and/or FIG. 2b transmitted from the touch controller 110, the processor 140 can calculate the touch area by using the same method as that by which the touch controller 110 calculates the touch area.

Here, the processor 140 can calculate a touch time period by using the touch position, touch area and/or change amount in the electrical characteristics transmitted from the touch controller 110. According to the embodiment of the present invention, the processor 140 may be an application processor. The application processor is a processing device capable of performing functions such as command interpretation, operations, and control, etc., in a portable electronic device.

Specifically, the processor 140 measures a time period for which the change amount in the electrical characteristics is maintained greater than or equal to a predetermined value, and thus, can calculate a time period for which the object 50 touches the touch screen 130. When the change amount in the electrical characteristics is less than the predetermined value, the change amount in the electrical characteristics is generally within an error range and the touch may not be recognized as a valid touch in the touch input device 100.

FIGS. 3a and 3b are views for describing the touch time period. In FIG. 3, a case where the electrical characteristic is a capacitance will be described as an example. For example, FIG. 3a shows that a valid touch time period for which the change amount of the capacitance is maintained greater than or equal to a predetermined value is 8 t (1 t to 9 t). That is, the processor 140 can calculate that the time period taken from when the touch is input to when the touch is released is 8 t. Here, the valid touch in FIG. 3a may include hovering.

Although it has been described above that the processor 140 calculates the touch time period by using the touch position, touch area and/or change amount in the electrical characteristics transmitted from the touch controller 110, the touch controller 110 may transmit a touch recognition starting point and a touch recognition completion point to the processor 140. For example, at the time point 1 t, that is, the time point at which the capacitance change amount shown in FIG. 3a increases greater than the predetermined value, the touch controller 110 may transmit a touch start stamp to the processor 140. At the time point 9 t, that is, the time point at which the capacitance change amount decreases less than the predetermined value, the touch controller 110 may transmit a touch completion stamp to the processor 140. The processor 140 can calculate the touch time period by calculating a difference between the touch start stamp transmission point and the touch completion stamp transmission point.

In addition, the processor 140 can calculate a time period for which the touch input to the touch screen 130 maintains the satisfaction of a predetermined condition. For example, when the predetermined condition is a condition that the touch area is greater than or equal to a predetermined reference area, the processor 140 measures, as shown in FIG. 3b, only the time period in which the touch area is greater than or equal to a predetermined area, thereby calculating the time period for which the touch input to the touch screen 130 maintains the satisfaction of the predetermined condition. For example, in FIG. 3b, it can be seen that the time period for which the touch maintains the satisfaction of the predetermined condition is 2 t (2 t to 4 t).

FIGS. 4a to 4c are views for describing types in which various sensors are arranged in the touch input device according to the embodiment of the present invention.

The user authentication controller 150 according to the embodiment of the present invention can determine whether the touch input to the touch screen 130 is a touch by an authenticated user or not. Specifically, the user authentication controller 150 compares information collected through a user authentication sensor 40 disposed in the touch input device 100 with pre-stored user authentication information, and thus, can determine whether the input touch has occurred by an authenticated user or not. Here, the user authentication sensor may be a fingerprint sensor. Specifically, as shown in FIGS. 4a and 4b, a touch sensor 30 may be disposed in the entire area of the touch screen 130, and the user authentication sensor 40 may be disposed only in a predetermined area of the touch screen 130.

The touch input device 100 according to the embodiment of the present invention may further include a pressure controller (not shown). Specifically, the pressure controller measures the electrical characteristics which are changed by a pressure applied to the touch screen 130 by the object 50 through a pressure sensor disposed in the touch input device 100, thereby calculating the magnitude of the touch pressure from the measured change amount in the electrical characteristics. Here, the change amount in the electrical characteristics may change according to the magnitude of the touch pressure. Here, the less the magnitude of the touch pressure, the less the change amount in the electrical characteristics, and the greater the magnitude of the touch pressure, the greater the change amount in the electrical characteristics. The pressure controller may transmit the magnitude of the touch pressure calculated from the measured change amount in the electrical characteristics to the processor 140.

Although it has been described above that the pressure controller provided separately from the touch controller 110 detects the magnitude of the pressure, the touch controller 110 can detect both the touch position and the magnitude of the touch pressure. Also, one controller can perform not only the touch position detection and the touch pressure magnitude detection but the user authentication.

Here, as shown in FIGS. 4b and 4c, a screen may be displayed on the entire top surface area of the touch input device 100. In this case, the touch screen 130 is also disposed in the entire top surface area of the touch input device 100. As shown in FIGS. 4a to 4c, the touch sensor, the pressure sensor, and the user authentication sensor included in the touch input device 100 may be arranged only in separate areas respectively or may be arranged so as to overlap each other. Here, the user authentication sensor 40 may be the same as or separate from the touch sensor 30. Specifically, as shown in FIG. 4c, the same sensor 30 can perform the user authentication and also detect the touch position. Here, since, compared to the touch position detection, information on a relatively very narrow area is required for fingerprint recognition, the resolution of the sensor at the time of the user authentication must be higher than the resolution of the sensor at the time of the touch position detection. Therefore, as shown in FIG. 4c, at the time of the user authentication, both a first sensor 31 and a second sensor 32 are activated to detect high resolution information. Also, at the time of the touch position detection, only the first sensor 31 is activated to detect low resolution information. The second sensor 32 is not activated at the time of the touch position detection in order that unnecessary power consumption is reduced. Further, by using touch position information, only the second sensor 32, which can be used to sense a predetermined area around the touch position, is activated at the time of the user authentication, and the second sensor 32, which is not used to sense a predetermined area around the touch position, may not be activated. Through such a configuration shown in FIG. 4c, the touch position detection and the user authentication can be performed in the entire area of the touch screen 130 of the touch input device.

Likewise, although it has been described above that the magnitude of the pressure is detected through the pressure sensor provided separately from the touch sensor, both the touch position and the magnitude of the touch pressure can be detected through the touch sensor. In summary, through the touch sensor, not only the touch position and the magnitude of the touch pressure can be performed, but also the user authentication can be performed.

Also, it has been described above that the user authentication controller 150 is provided separately from the touch controller 110. However, when, as shown in FIG. 4c, the user authentication is performed and the touch position is detected by using the same sensor 30, one controller can also perform both the touch position detection and the user authentication.

Here, when the user authentication should be performed and the touch position and the touch pressure should be detected at the same position, it is not possible to determine what operation the processor 140 should perform, only by the position of the touch input to the touch screen 130. Therefore, there is a demand for a criterion for determining what operation the processor 140 performs.

In this specification, a basic touch input to the touch input device 100 may be designated as a tab touch. When the tab touch is input to the touch input device 100, a set operation according to the tab touch may be performed.

A touch which lasts for a predetermined time period relatively longer than that of the tab touch, that is to say, a time period greater than or equal to a long touch determination criterion time period may be designated as a long touch. When the long touch is input to the touch input device 100, a set operation according to the long touch may be performed. Here, it is clear that various operations can be set according to the amount of the touch time period of the long touch.

Further, when the input touch satisfies an authentication condition, the touch may be designated as an authentication touch. When the authentication touch is input to the touch input device 100, a user authentication operation may be performed. Here, the authentication condition may be a condition that a time period satisfying a predetermined condition is equal to or greater than a predetermined reference time period ΔT. Specifically, the predetermined condition may be a condition that the touch area is equal to or greater than a predetermined reference area A1. Also, the predetermined condition may be a condition that a predetermined reference pattern is recognized from the touch.

Also, a touch having a relatively higher pressure than that of the tab touch, that is to say, a touch having a pressure equal to or higher than a predetermined reference pressure F1 may be designated as a force touch. When the force touch is input to the touch input device 100, a set operation according to the force touch may be performed. Here, it is apparent that a variety of operations can be set according to the size level of the force touch.

Here, when determining whether a touch is the authentication touch or the long touch in accordance with a criterion for distinguishing between the tab touch and the authentication touch and a criterion for distinguishing between the tab touch and the long touch, an overlap may occur. Likewise, when determining whether a touch is the authentication touch or the force touch in accordance with a criterion for distinguishing between the tab touch and the authentication touch and a criterion for distinguishing between the tab touch and the force touch, an overlap may occur. For example, when a time period for which the input touch satisfies the predetermined condition is equal to or greater than the predetermined reference time period ΔT, the touch may be recognized as the authentication touch, and under this state, when the input touch lasts for a time period longer than a predetermined time period, the touch may be also recognized as the long touch as well. Additionally, when a time period for which the input touch satisfies the predetermined condition is equal to or greater than the predetermined reference time period ΔT, the touch may be recognized as the authentication touch, and under this state, when the input touch has a pressure equal to or higher than the predetermined reference pressure F1, the touch may be also recognized as the force touch as well.

Therefore, for the purpose of overcoming this problem, the embodiment of the present invention provides a method for clearly distinguishing between the authentication touch and the long touch and/or the authentication touch and the force touch, an algorithm and a device of the same.

FIG. 5 is a graph showing touch types which are distinguished by a method for distinguishing between the long touch and the authentication touch in accordance with the embodiment of the present invention. FIG. 5 shows that "a" represents the authentication touch, "b" represents the tab touch, and "c" represents the long touch. Hereinafter, a case where a predetermined condition included in the authentication condition is a condition that the touch area is equal to or greater than the predetermined reference area A1 will be described. When the condition that the touch area is equal to or greater than the predetermined reference area A1 is satisfied, an authentication mode is entered. When a time period for which the corresponding condition is maintained from a time point Ts at which the authentication mode is entered is equal to or greater than the predetermined reference time period ΔT, the input touch satisfies the authentication condition and may be set as the authentication touch "a". Also, when the authentication mode is not entered because the condition that the touch area is equal to or greater than the predetermined reference area A1 is not satisfied, or even though the authentication mode is entered because the condition that the touch area is equal to or greater than the predetermined reference area A1 is satisfied, when a time period for which the corresponding condition is maintained from the time point Ts at which the authentication mode is entered is equal to or less than the predetermined reference time period ΔT and when a touch release time point $T_R$ is prior to a long touch determination criterion time point $T_L$, the input touch may be set as the tab touch "b". Also, when the authentication mode is not entered because the condition that the touch area is equal to or greater than the predetermined reference area A1 is not satisfied, or even though the authentication mode is entered because the condition that the touch area is equal to or greater than the predetermined reference area A1 is satisfied, when a time period for which the corresponding condition is maintained from the time point Ts at which the authentication mode is entered is equal to or less than the predetermined reference time period ΔT and when the input touch is not released until the long touch determination criterion time point $T_L$, the input touch may be set as the long touch "c".

In summary, the touch type distinguishing method in the touch input device including the touch screen according to the embodiment of the present invention may include a step of determining whether the touch on the touch screen satisfies a predetermined condition or not and a touch type determination step of determining the touch type in accordance with whether or not the touch satisfies a predetermined condition, and the time period for which the touch is maintained. Specifically, when the touch satisfies a predetermined condition, the input touch can be determined as the authentication touch. When the input touch is released prior to the long touch determination criterion time point $T_L$, the input touch can be determined as the tab touch. When the input touch is not released until the long touch determination criterion time point $T_L$, the input touch can be determined as the long touch.

Also, the touch type distinguishing method in the touch input device including the touch screen according to the embodiment of the present invention may include a step of determining whether the touch on the touch screen satisfies a predetermined condition or not and a touch type determination step of determining the touch type in accordance with whether or not the touch satisfies a predetermined condition, the time period for which the touch is maintained, and the pressure applied by the touch. Specifically, when the touch satisfies a predetermined condition, the input touch can be determined as the authentication touch. When the pressure applied by the touch is equal to or greater than a predetermined reference pressure, the input touch can be determined as the force touch. When the input touch is released prior to the long touch determination criterion time point $T_L$, the input touch can be determined as the tab touch. When the input touch is not released until the long touch determination criterion time point $T_L$, the input touch can be determined as the long touch.

FIG. 6 is a flowchart showing the method for distinguishing between the long touch and the authentication touch in accordance with the embodiment of the present invention. FIGS. 7a to 7d are graphs for describing various time points at which the long touch and the authentication touch occur according to the embodiment of the present invention. The method for distinguishing between the long touch and the authentication touch in accordance with the embodiment of the present invention can be performed by the processor 140. According to the embodiment of the present invention, the method can be also performed by other components such as the touch controller 110, etc.

First, the processor 140 performs a touch recognition step S100 of determining whether the touch occurs on the touch screen 130 or not on the basis of the change amount in the electrical characteristics transmitted from the touch controller 110 and/or touch information. Here, the touch information may include whether the touch occurs or not, the touch position and/or the touch pressure. Here, when it is determined that there is no touch, no operation is performed S110, and then the processor 140 returns to the touch recognition step S100.

When it is determined in the touch recognition step S100 that the touch occurs, the processor 140 performs an authentication mode entry determination step S120 of determining whether the touch satisfies an authentication mode entry condition or not. Specifically, when the input touch satisfies a predetermined condition, the processor 140 determines that the touch satisfies the authentication mode entry condition. When the input touch is determined to satisfy the authentication mode entry condition, the processor 140 transmits an authentication start signal to the user authentication controller 150. The user authentication controller 150 starts user authentication information collection and determination.

When the touch is determined to satisfy the authentication mode entry condition in the authentication mode entry determination step S120, the processor 140 performs an authentication touch determination step S130 of determining whether the touch satisfies an authentication mode completion condition or not. Specifically, when a time period for which the touch maintains the satisfaction of the predetermined condition from a time point at which the input touch starts to satisfy the predetermined condition, that is to say, from the authentication mode entry time point Ts is equal to or greater than the predetermined reference time period ΔT, the processor 140 determines that the touch satisfies the authentication mode completion condition.

Here, the touch type determination step of determining the touch type in accordance with whether or not the time period for which the touch maintains the satisfaction of the predetermined condition is equal to or greater than the predetermined reference time period may be performed. The touch type determination step may specifically include the following steps.

When the input touch is determined to satisfy the authentication mode completion condition, the touch can be determined as the authentication touch. Here, the processor 140 transmits an authentication result information request signal to the user authentication controller 150, and the user authentication controller 150 transmits, to the processor 140, a signal including information on a user authentication result determined by using the collected user authentication information. Alternatively, the processor 140 does not transmit the authentication result information request signal to the user authentication controller 150, and the user authentication controller 150 may transmit, to the processor 140, a signal including information on the user authentication result determined by using the collected user authentication information. The processor 140 can perform an authentication operation step S140 of performing operations assigned according to the user authentication result. For example, when the user authentication is successful, a login operation can be performed. When the user authentication fails, a login failure guide operation can be performed.

When the touch is determined not to satisfy the authentication mode completion condition in the authentication touch determination step S130, the processor 140 returns to the authentication mode entry determination step S120. Here, the processor 140 transmits an authentication start signal to the user authentication controller 150. The user authentication controller 150 interrupts the user authentication information collection and determination.

When the touch is determined not to satisfy the authentication mode entry condition in the authentication mode entry determination step S120, the processor 140 performs a tab touch determination step S150 of determining whether the touch satisfies a tab touch condition or not. Specifically, when the touch is released prior to the long touch determination criterion time point $T_L$, the processor 140 determines that the touch satisfies the tab touch condition. When the input touch is determined to satisfy the tab touch condition, the touch can be determined as the tab touch. Here, the processor 140 can perform a tab touch operation step S160 of performing operations assigned to the tab touch.

When the touch is determined not to satisfy the tab touch condition in the tab touch determination step S150, the processor 140 performs a long touch determination step S170 of determining whether the touch satisfies a long touch condition or not. Specifically, when the time period for which the touch is maintained passes the long touch determination criterion time point $T_L$, the processor 140 determines that the touch satisfies the long touch condition. When the input touch is determined to satisfy the long touch condition, the touch can be determined as the long touch. Here, the processor 140 can perform a long touch operation step S180 of performing operations assigned to the long touch.

When the touch is determined not to satisfy the long touch condition in the long touch determination step S170, the processor 140 returns to the authentication mode entry determination step S120.

According to the distinguishing method described in FIG. 6, as shown in FIG. 7a, when the authentication mode completion condition is satisfied prior to the long touch determination criterion time point $T_L$, the touch can be determined as the authentication touch. Also, when the input touch starts to satisfy the predetermined condition prior to the long touch determination criterion time point $T_L$ and when the time period for which the input touch maintains the satisfaction of the predetermined condition is equal to or greater than the predetermined reference time period, the touch can be determined as the authentication touch. Specifically, as shown in FIG. 7b, even though the long touch determination criterion time point $T_L$ passes before the time period for which the input touch maintains the satisfaction of the predetermined condition, that is to say, the predetermined reference time period ΔT passes from the time point at which the input touch starts to satisfy the predetermined condition, that is to say, from the authentication mode entry time point Ts, in other words, even though the long touch determination criterion time point $T_L$ passes before the authentication mode completion condition is satisfied, in the case where the authentication mode entry time point Ts is prior to the long touch determination criterion time point $T_L$, the processor 140 keeps determining whether the touch satisfies the authentication mode completion condition or not. When the touch satisfies the authentication mode completion condition, the touch can be determined as the authentication touch. Also, as shown in FIG. 7c, when a time period from the time point at which the input touch starts to satisfy the predetermined condition, that is to say, from the authentication mode entry time point Ts to a time point TC at which the input touch finishes satisfying the predetermined condition, in other words, when the time period for which the input touch maintains the satisfaction of the predetermined condition is less than the predetermined reference time period ΔT, the touch is not determined as the authentication touch. Then, when the long touch determination criterion time point $T_L$ passes, the touch is determined as the long touch. Namely, when the touch is not determined as the authentication touch and the touch is maintained until the long touch determination criterion time point $T_L$, the touch is determined as the long touch. Also, as shown in FIG. 7d, when the input touch is not determined as the authentication touch and then the touch release time point $T_R$ occurs prior to the long touch determination criterion time point $T_L$, the touch can be determined as the tab touch. That is, when the input touch is not determined as the authentication touch and the touch is released prior to the long touch determination criterion time point $T_L$, the touch can be determined as the tab touch.

FIG. 8 is a flowchart showing another method for distinguishing between the long touch and the authentication touch in accordance with the embodiment of the present invention.

First, the processor 140 performs a touch recognition step S200 of determining whether the touch occurs on the touch screen 130 or not on the basis of the change amount in the electrical characteristics transmitted from the touch controller 110 and/or touch information. Here, the touch information may include whether the touch occurs or not, the touch position and/or the touch pressure. Here, when it is determined that there is no touch, no operation is performed S210, and then the processor 140 returns to the touch recognition step S200.

When it is determined in the touch recognition step S200 that the touch occurs, the processor 140 performs an authentication mode entry determination step S220 of determining whether the touch satisfies an authentication mode entry condition or not. Specifically, when the input touch satisfies a predetermined condition, the processor 140 determines that the touch satisfies the authentication mode entry condition. When the input touch is determined to satisfy the authentication mode entry condition, the processor 140 transmits an authentication start signal to the user authentication controller 150. The user authentication controller 150 starts user authentication information collection and determination.

When the touch is determined to satisfy the authentication mode entry condition in the authentication mode entry determination step S220, the processor 140 performs an authentication touch determination step S230 of determining whether the touch satisfies an authentication mode completion condition or not. Specifically, when a time period for which the touch maintains the satisfaction of the predetermined condition from a time point at which the input touch starts to satisfy the predetermined condition, that is to say, from the authentication mode entry time point Ts is equal to or greater than the predetermined reference time period $\Delta T$ and when a time point Ts+$\Delta T$ at which the predetermined reference time period $\Delta T$ has passed while the input touch satisfies the predetermined condition is prior to the long touch determination criterion time point $T_L$, the processor 140 determines that the touch satisfies the authentication mode completion condition. When the input touch is determined to satisfy the authentication mode completion condition, the touch can be determined as the authentication touch. Here, the processor 140 transmits an authentication result information request signal to the user authentication controller 150, and the user authentication controller 150 transmits, to the processor 140, a signal including information on a user authentication result determined by using the collected user authentication information. Alternatively, the processor 140 does not transmit the authentication result information request signal to the user authentication controller 150, and the user authentication controller 150 may transmit, to the processor 140, a signal including information on the user authentication result determined by using the collected user authentication information. The processor 140 can perform an authentication operation step S240 of performing operations assigned according to the user authentication result. For example, when the user authentication is successful, a login operation can be performed. When the user authentication fails, a login failure guide operation can be performed.

When the touch is determined not to satisfy the authentication mode completion condition in the authentication touch determination step S230, the processor 140 returns to the authentication mode entry determination step S220. Here, the processor 140 transmits an authentication start signal to the user authentication controller 150. The user authentication controller 150 interrupts the user authentication information collection and determination.

When the touch is determined not to satisfy the authentication mode entry condition in the authentication mode entry determination step S220, the processor 140 performs a tab touch determination step S250 of determining whether the touch satisfies a tab touch condition or not. Specifically, when the touch is released prior to the long touch determination criterion time point $T_L$, the processor 140 determines that the touch satisfies the tab touch condition. When the input touch is determined to satisfy the tab touch condition, the touch can be determined as the tab touch. Here, the processor 140 can perform a tab touch operation step S260 of performing operations assigned to the tab touch.

When the touch is determined not to satisfy the tab touch condition in the tab touch determination step S250, the processor 140 performs a long touch determination step S270 of determining whether the touch satisfies a long touch condition or not. Specifically, when the time period for which the touch is maintained passes the long touch determination criterion time point $T_L$, the processor 140 determines that the touch satisfies the long touch condition. When the input touch is determined to satisfy the long touch condition, the touch can be determined as the long touch. Here, the processor 140 can perform a long touch operation step S280 of performing operations assigned to the long touch.

When the touch is determined not to satisfy the long touch condition in the long touch determination step S270, the processor 140 returns to the authentication mode entry determination step S220.

According to the distinguishing method described in FIG. 8, when a condition that the time period for which the input touch maintains the satisfaction of the predetermined condition is equal to or greater than the predetermined reference time period is satisfied prior to the long touch determination criterion time point, the touch can be determined as the authentication touch. Specifically, as shown in FIG. 7a, when the authentication mode completion condition is satisfied prior to the long touch determination criterion time point $T_L$, the touch can be determined as the authentication touch. Here, as shown in FIG. 7b, when the long touch determination criterion time point $T_L$ passes before the time period for which the input touch maintains the satisfaction of the predetermined condition, that is to say, the predetermined reference time period $\Delta T$ passes from the time point at which the input touch starts to satisfy the predetermined condition, that is to say, from the authentication mode entry time point Ts, in other words, when the long touch determination criterion time point $T_L$ passes before the authentication mode completion condition is satisfied, the touch can be determined as the long touch.

In the touch input device 100, the operations assigned according to the user authentication result are immediately performed at the time point Ts+ΔT, the operations assigned to the long touch are immediately performed at the time point $T_L$, and the operations assigned to the tab touch are immediately performed at the time point $T_R$. Therefore, while it is not checked whether or not other conditions are satisfied after each of the conditions is satisfied, the foregoing has also marked and described a time point at which other conditions are satisfied after each condition is satisfied, in order to describe priority of each touch type.

Through a comparison of the distinguishing method described in FIG. 6 and the distinguishing method described in FIG. 8, there are differences in priorities of respective touch types. Specifically, unlike the long touch and tap touch, in the case of the authentication touch, there exists the time period ΔT for determining whether or not the touch satisfies the authentication mode completion condition after the authentication mode is entered. Therefore, when the long touch determination criterion time point $T_L$ exists within the time period ΔT, there is a need to determine which type of touch should be distinguished first. In FIG. 6, the priority for distinguishing the authentication touch is higher than the priority for distinguishing the long touch. In FIG. 8, the priority for distinguishing the long touch is higher than the priority for distinguishing the authentication touch.

While it has been described in the flowcharts of FIGS. 6 and 8 that the types of touches input in the order of the authentication touch, tab touch, and long touch are distinguished, the types of touches can be also distinguished in the changed order. Specifically, in FIG. 6, the type of the input touch is determined as a type corresponding to an event that occurs earliest among an event that satisfies a condition that the input touch starts to satisfy the predetermined condition prior to the long touch determination criterion time point and the time period for which the touch maintains the satisfaction of the predetermined condition is equal to or greater than the predetermined reference time period, an event where the touch is released, and an event where the time period for which the touch is maintained passes the long touch determination criterion time point. In FIG. 8, the type of the input touch is determined as a type corresponding to an event that occurs earliest among an event that satisfies a condition that the time period for which the input touch maintains the satisfaction of the predetermined condition is equal to or greater than the predetermined reference time period, an event where the touch is released, and an event where the time period for which the touch is maintained passes the long touch determination criterion time point.

FIG. 9 is a flowchart showing a method for distinguishing between the long touch, the force touch, and the authentication touch in accordance with the embodiment of the present invention. FIGS. 10*a* to 10*c* are graphs for describing various time points at which the long touch, the force touch, and the authentication touch occur according to the embodiment of the present invention. The method for distinguishing between the long touch, the force touch, and the authentication touch in accordance with the embodiment of the present invention can be performed by the processor 140. According to the embodiment of the present invention, the method can be also performed by other components such as the touch controller 110, etc.

First, the processor 140 performs a touch recognition step S300 of determining whether the touch occurs on the touch screen 130 or not on the basis of the change amount in the electrical characteristics transmitted from the touch controller 110 and/or touch information. Here, the touch information may include whether the touch occurs or not, the touch position and/or the touch pressure. Here, when it is determined that there is no touch, no operation is performed S310, and then the processor 140 returns to the touch recognition step S300.

When it is determined in the touch recognition step S300 that the touch occurs, the processor 140 performs an authentication mode entry determination step S320 of determining whether the touch satisfies an authentication mode entry condition or not. Specifically, when the input touch satisfies a predetermined condition, the processor 140 determines that the touch satisfies the authentication mode entry condition. When the input touch is determined to satisfy the authentication mode entry condition, the processor 140 transmits an authentication start signal to the user authentication controller 150. The user authentication controller 150 starts user authentication information collection and determination.

When the touch is determined to satisfy the authentication mode entry condition in the authentication mode entry determination step S320, the processor 140 performs a force touch continuation determination step S330 of determining whether the touch satisfies a force touch condition or not. Specifically, when, after the authentication mode is entered, the pressure applied by the input touch is equal to or greater than the predetermined reference pressure F1 within the predetermined reference time period ΔT, the processor 140 determines that the touch satisfies the force touch condition.

When the touch is determined not to satisfy the force touch condition in the force touch continuation determination step S330, the processor 140 performs an authentication touch determination step S340 of determining whether the touch satisfies the authentication mode completion condition or not. Specifically, when a time period for which the touch maintains the satisfaction of the predetermined condition from a time point at which the input touch starts to satisfy the predetermined condition, that is to say, from the authentication mode entry time point Ts is equal to or greater than the predetermined reference time period ΔT, the processor 140 determines that the touch satisfies the authentication mode completion condition.

Here, the touch type determination step of determining the touch type in accordance with whether or not the time period for which the touch maintains the satisfaction of the predetermined condition is equal to or greater than the predetermined reference time period may be performed. The touch type determination step may specifically include the following steps.

When the input touch is determined to satisfy the authentication mode completion condition, the touch can be determined as the authentication touch. Here, the processor 140 transmits an authentication result information request signal to the user authentication controller 150, and the user authentication controller 150 transmits, to the processor 140, a signal including information on a user authentication result determined by using the collected user authentication information. Alternatively, the processor 140 does not transmit the authentication result information request signal to the user authentication controller 150, and the user authentication controller 150 may transmit, to the processor 140, a signal including information on the user authentication result determined by using the collected user authentication information. The processor 140 can perform an authentication operation step S350 of performing assigned operations according to the user authentication result. For example, when the user authentication is successful, a login operation can be performed. When the user authentication fails, a login failure guide operation can be performed.

When the touch is determined not to satisfy the authentication mode completion condition in the authentication touch determination step S340, the processor 140 returns to the authentication mode entry determination step S320. Here, the processor 140 transmits an authentication start signal to the user authentication controller 150. The user authentication controller 150 interrupts the user authentication information collection and determination.

When the touch is determined not to satisfy the authentication mode entry condition in the authentication mode entry determination step S320, the processor 140 performs a force touch determination step S360 of determining whether the touch satisfies the force touch condition or not. Specifically, when the pressure applied by the input touch is equal to or greater than the predetermined reference pressure F1, the processor 140 determines that the touch satisfies the force touch condition. When the input touch is determined to satisfy the force touch condition, the touch can be determined as the force touch. Here, the processor 140 can perform a force touch operation step S370 of performing operations assigned to the force touch. Also, when the input touch is determined to satisfy the force touch condition in the force touch continuation determination step S330, the touch can be determined as the force touch. Likewise, the processor 140 can perform a force touch operation step S370 of performing operations assigned to the force touch.

When the touch is determined not to satisfy the force touch condition in the force touch determination step S360, the processor 140 performs a tab touch determination step S380 of determining whether the touch satisfies the tab touch condition or not. Specifically, when the touch is released prior to the long touch determination criterion time point $T_L$, the processor 140 determines that the touch satisfies the tab touch condition. When the input touch is determined to satisfy the tab touch condition, the touch can be determined as the tab touch. Here, the processor 140 can perform a tab touch operation step S390 of performing operations assigned to the tab touch.

When the touch is determined not to satisfy the tab touch condition in the tab touch determination step S380, the processor 140 performs a long touch determination step S400 of determining whether the touch satisfies a long touch condition or not. Specifically, when the time period for which the touch is maintained passes the long touch determination criterion time point $T_L$, the processor 140 determines that the touch satisfies the long touch condition. When the input touch is determined to satisfy the long touch condition, the touch can be determined as the long touch. Here, the processor 140 can perform a long touch operation step S410 of performing operations assigned to the long touch.

When the touch is determined not to satisfy the long touch condition in the long touch determination step S400, the processor 140 returns to the authentication mode entry determination step S320.

According to the distinguishing method described in FIG. 9, as shown in FIG. 10a, when a pressure equal to or higher than the predetermined reference pressure F1 is applied prior to the time point at which the input touch starts to satisfy the predetermined condition, that is to say, prior to the authentication mode entry time point Ts, the touch can be determined as the force touch. Here, as shown in FIG. 10b, when a pressure equal to or higher than the predetermined reference pressure F1 is applied before the time period for which the input touch maintains the satisfaction of the predetermined condition, that is to say, the predetermined reference time period ΔT passes from the time point at which the input touch starts to satisfy the predetermined condition, that is to say, from the authentication mode entry time point Ts, the touch can be determined as the force touch. Also, as shown in FIG. 10c, when a pressure equal to or higher than the predetermined reference pressure F1 is not applied during the time period for which the input touch maintains the satisfaction of the predetermined condition, that is to say, the predetermined reference time period ΔT passes from the time point at which the input touch starts to satisfy the predetermined condition, that is to say, from the authentication mode entry time point Ts, the touch can be determined as the authentication touch. In other words, when the pressure applied by the touch less than a predetermined reference pressure until the condition that the time period for which the input touch maintains the satisfaction of the predetermined condition is equal to or greater than the predetermined reference time period is satisfied, the touch can be determined as the authentication touch.

FIG. 11 is a flowchart showing another method for distinguishing between the long touch, the force touch, and the authentication touch in accordance with the embodiment of the present invention.

First, the processor 140 performs a touch recognition step S500 of determining whether the touch occurs on the touch screen 130 or not on the basis of the change amount in the electrical characteristics transmitted from the touch controller 110 and/or touch information. Here, the touch information may include whether the touch occurs or not, the touch position and/or the touch pressure. Here, when it is determined that there is no touch, no operation is performed S510, and then the processor 140 returns to the touch recognition step S500.

When it is determined in the touch recognition step S500 that the touch occurs, the processor 140 performs an authentication mode entry determination step S520 of determining whether the touch satisfies an authentication mode entry condition or not. Specifically, when the input touch satisfies a predetermined condition, the processor 140 determines that the touch satisfies the authentication mode entry condition. When the input touch is determined to satisfy the authentication mode entry condition, the processor 140 transmits an authentication start signal to the user authentication controller 150. The user authentication controller 150 starts user authentication information collection and determination.

When the touch is determined to satisfy the authentication mode entry condition in the authentication mode entry determination step S520, the processor 140 performs an authentication touch determination step S530 of determining whether the touch satisfies an authentication mode completion condition or not. Specifically, when a time period for which the touch maintains the satisfaction of the predetermined condition from a time point at which the input touch starts to satisfy the predetermined condition, that is to say, from the authentication mode entry time point Ts is equal to or greater than the predetermined reference time period ΔT, the processor 140 determines that the touch satisfies the authentication mode completion condition.

Here, the touch type determination step of determining the touch type in accordance with whether or not the time period for which the touch maintains the satisfaction of the predetermined condition is equal to or greater than the predetermined reference time period may be performed. The touch type determination step may specifically include the following steps.

When the input touch is determined to satisfy the authentication mode completion condition, the touch can be determined as the authentication touch. Here, the processor 140 transmits an authentication result information request signal to the user authentication controller 150, and the user authentication controller 150 transmits, to the processor 140, a signal including information on a user authentication result determined by using the collected user authentication information. Alternatively, the processor 140 does not transmit the authentication result information request signal to the user authentication controller 450, and the user authentication controller 150 may transmit, to the processor 140, a signal including information on the user authentication result determined by using the collected user authentication information. The processor 140 can perform an authentication operation step S540 of performing assigned operations according to the user authentication result. For example, when the user authentication is successful, a login operation can be performed. When the user authentication fails, a login failure guide operation can be performed.

When the touch is determined not to satisfy the authentication mode completion condition in the authentication touch determination step S530, the processor 140 returns to the authentication mode entry determination step S520. Here, the processor 140 transmits an authentication start signal to the user authentication controller 150. The user authentication controller 150 interrupts the user authentication information collection and determination.

When the touch is determined not to satisfy the authentication mode entry condition in the authentication mode entry determination step S520, the processor 140 performs a force touch determination step S550 of determining whether the touch satisfies a force touch condition or not. Specifically, when the pressure applied by the input touch is equal to or greater than the predetermined reference pressure F1, the processor 140 determines that the touch satisfies the force touch condition. When the input touch is determined to satisfy the force touch condition, the touch can be determined as the force touch. Here, the processor 140 can perform a force touch operation step S560 of performing operations assigned to the force touch.

When the touch is determined not to satisfy the force touch condition in the force touch determination step S550, the processor 140 performs a tab touch determination step S570 of determining whether the touch satisfies the tab touch condition or not. Specifically, when the touch is released prior to the long touch determination criterion time point $T_L$, the processor 140 determines that the touch satisfies the tab touch condition. When the input touch is determined to satisfy the tab touch condition, the touch can be determined as the tab touch. Here, the processor 140 can perform a tab touch operation step S580 of performing operations assigned to the tab touch.

When the touch is determined not to satisfy the tab touch condition in the tab touch determination step S570, the processor 140 performs a long touch determination step S590 of determining whether the touch satisfies a long touch condition or not. Specifically, when the time period for which the touch is maintained passes the long touch determination criterion time point $T_L$, the processor 140 determines that the touch satisfies the long touch condition. When the input touch is determined to satisfy the long touch condition, the touch can be determined as the long touch. Here, the processor 140 can perform a long touch operation step S600 of performing operations assigned to the long touch.

When the touch is determined not to satisfy the long touch condition in the long touch determination step S590, the processor 140 returns to the authentication mode entry determination step S520.

According to the distinguishing method described in FIG. 11, as shown in FIG. 10*a*, when a pressure equal to or higher than the predetermined reference pressure F1 is applied prior to the time point at which the input touch starts to satisfy the predetermined condition, that is to say, prior to the authentication mode entry time point Ts, the touch can be determined as the force touch. Here, as shown in FIG. 10*b*, even though a pressure equal to or higher than the predetermined reference pressure F1 is applied before the time period for which the input touch maintains the satisfaction of the predetermined condition, that is to say, the predetermined reference time period ΔT passes from the time point at which the input touch starts to satisfy the predetermined condition, that is to say, from the authentication mode entry time point Ts, the processor 140 continuously determines whether the touch satisfies the authentication mode completion condition or not. When the touch satisfies the authentication mode completion condition, the touch can be determined as the authentication touch. In other words, when the pressure applied by the touch is less than the predetermined reference pressure before the input touch starts to satisfy the predetermined condition and when the time period for which the touch maintains the satisfaction of the predetermined condition is equal to or greater than the predetermined reference time period, the touch can be determined as the authentication touch.

Through a comparison of the distinguishing method described in FIG. 9 and the distinguishing method described in FIG. 11, there are differences in priorities of respective touch types. Specifically, unlike the long touch, force touch, and tap touch, in the case of the authentication touch, there exists the time period ΔT for determining whether or not the touch satisfies the authentication mode completion condition after the authentication mode is entered. Therefore, when a force touch application time point $T_F$ exists within the time period ΔT, there is a need to determine which type of touch should be distinguished first. In FIG. 9, the priority for distinguishing the force touch is higher than the priority for distinguishing the authentication touch. In FIG. 11, the priority for distinguishing the authentication touch is higher than the priority for distinguishing the force touch.

While it has been described in the flowcharts of FIGS. 9 and 11 that the types of touches input in the order of the authentication touch, force touch, tab touch, and long touch are distinguished, the types of touches can be also distinguished in the changed order. Specifically, in FIG. 9, the type of the input touch is determined as a type corresponding to an event that occurs earliest among an event where a condition that the time period for which the input touch maintains the satisfaction of the predetermined condition is equal to or greater than the predetermined reference time period and the pressure applied by the touch is less than the predetermined reference pressure until the condition is satisfied, an event where the pressure applied by the touch is equal to or greater than the predetermined reference pressure, an event where the touch is released, and an event where the time period for which the touch is maintained passes the long touch determination criterion time point. In FIG. 11, the type of the input touch is determined as a type corresponding to an event that occurs earliest among an event that satisfies a condition that the pressure applied by the touch is less than the predetermined reference pressure until the input touch starts to satisfy the predetermined condition and a condition that the time period for which the touch maintains the satisfaction of the predetermined condition is equal to or greater than the predetermined reference time period, an event where the pressure applied by the touch is equal to or greater than the predetermined reference pressure, an event where the touch is released, and an event where the time period for which the touch is maintained passes the long touch determination criterion time point.

In the distinguishing methods of FIGS. 9 and 11, only the priority for distinguishing the force touch and the priority for distinguishing the authentication touch are differently applied to the distinguishing methods of FIGS. 9 and 11, and an example in which the priority for distinguishing the authentication touch is higher than the priority for distinguishing the long touch has been, as shown in FIG. 6, applied. Additionally, as described in FIG. 8, an example in which the priority for distinguishing the long touch is higher than the priority for distinguishing the authentication touch can be also applied to FIGS. 9 and 11.

Likewise, in the touch input device 100, the operations assigned according to the user authentication result are immediately performed at the time point Ts+$\Delta$T, the operations assigned to the force touch is immediately performed at the time point $T_F$, the operations assigned to the long touch are immediately performed at the time point $T_L$, and the operations assigned to the tab touch are immediately performed at the time point $T_R$. Therefore, while it is not checked whether or not other conditions are satisfied after each of the conditions is satisfied, the foregoing has also marked and described a time point at which other conditions are satisfied after each condition is satisfied, in order to describe priority of each touch type.

The touch input device 100 including the touch screen 130 according to the embodiment of the present invention may further include a memory 120. The memory 120 can store the operations set according to the predetermined reference pressure F1, predetermined reference time period $\Delta$T, long touch determination criterion time point $T_L$, predetermined reference area A1, reference pattern, and touch type. The processor 140 according to the embodiment of the present invention can perform the distinguishing algorithm with reference to the memory 120.

It is necessary that the user of the touch input device 100 capable of performing the foregoing distinguishing algorithm does not confuse the authentication touch, long touch, and force touch with each other. However, the determination criterion, i.e., the predetermined reference pressure F1 and the predetermined reference area A1 may not be appropriate according to the age, physical condition, circumstances, etc., of the user. For example, in the case of a healthy man, the predetermined reference pressure F1 is less than the force of his hand. Therefore, when he tries to apply the authentication touch, the force control fails and his touch may be recognized as the force touch. Also, in the case of a child with a small force, the predetermined reference pressure F1 is much greater than the force of the child's hand. Therefore, when the child tries to apply the force touch, the child cannot touch with a pressure equal to or greater than the predetermined reference pressure F1 and the child's touch may be recognized as the long touch or authentication touch. Likewise, in the case of a man with a big hand, the predetermined reference area A1 is smaller than the size of his finger. Therefore, when he tries to apply the long touch, the area control fails and his touch may be recognized as the authentication touch. Also, in the case of a child with a small hand, the predetermined reference area A1 is much greater than the size of the child's finger. Therefore, when the child tries to apply the authentication touch, the child cannot touch an area equal to or greater than the predetermined reference area A1 and the child's touch may be recognized as the long touch or force touch.

For the purpose of solving these problems in the embodiment of the present invention, the magnitude of the predetermined reference pressure F1 and/or the size of the predetermined reference area A1, i.e., a force touch determination criterion, can be adjusted and set. For example, in the touch input device 100 according to the embodiment of the present invention, the predetermined reference pressure F1 and the predetermined reference area A1 may be set as default values in the memory 120. The user can change and set the predetermined reference pressure F1 and/or the predetermined reference area A1 if necessary.

FIGS. 12a and 12b show a method for adjusting a criterion for distinguishing the force touch in the touch input device according to the embodiment of the present invention.

As shown in FIG. 12a, a screen for setting the predetermined reference pressure F1 may be displayed on the touch screen 130. In FIG. 12a, the user may press a touch input area 22 of the touch screen 130 in order to set the predetermined reference pressure F1 that he/she wants. Here, a moving circle 20 can move on a bar 212 in accordance with the magnitude of the touch pressure of the user. The user can press the touch input area 22 until the touch pressure reaches his/her desired pressure level. The user can hold the pressing on the touch input area 22 at the corresponding pressure level for a predetermined period of time so as to set his/her own desired pressure level as the predetermined reference pressure F1, and then can release the pressing. As a result, the predetermined reference pressure F1 can be set as the corresponding pressure. This is just an example. The user is allowed to set the predetermined reference pressure F1 in the touch input device 100 in various ways. This set detail can be stored in the memory 120.

According to the embodiment of the present invention, the screen of the touch screen 130 may be divided, and the predetermined reference pressure F1 may be set differently for each divided screen. FIG. 12b shows that the screen of the touch screen 130 is divided into four and the predetermined reference pressure F1 is set for the divided screens 1, 2, 3, and 4 respectively. For example, a divided screen where the predetermined reference pressure F1 is set is selected and then the moving circle 20 is moved to a desired level of the predetermined reference pressure F1, so that the predetermined reference pressure F1 of the divided screen can be set. This setting process can be applied in the same manner to the remaining divided screens. Here, several or all the divided screens of the plurality of divided screens 1, 2, 3, and 4 are selected, and then the predetermined reference pressure F1 may be simultaneously set in the same manner. Here, the selection of the divided screen can be made by touching the divided screen intended to be selected. Then, the magnitude of the predetermined reference pressure F1 may be set by moving the moving circle 20.

The setting of the predetermined reference pressure F1 for the divided screens of the touch screen 130 shown in FIG. 12b is just an example. The predetermined reference pressure F1 can be set for the divided screens of the touch screen 130 through a variety of implementation methods. The setting of the predetermined reference pressure F1 for each divided screen may be made according to the method described with reference to FIG. 12a.

FIGS. 13a and 13b show a method for setting a predetermined criterion for the authentication touch in the touch input device according to the embodiment of the present invention.

As shown in FIG. 13a, a screen for setting the predetermined reference area A1 may be displayed on the touch screen 130. In the example shown in FIG. 13a, the user may touch a touch input area 22 of the touch screen 130 in order to set the predetermined reference area A1 that he/she wants. Here, the moving circle 20 can move on the bar 212 in accordance with the size of the touch area of the user. The user can touch the touch input area 22 until the touch pressure reaches his/her desired area level. The user can hold the touching of the touch input area 22 at the corresponding area level for a predetermined period of time so as to set his/her own desired area level as the predetermined reference area A1, and then can release the touching. As a result, the predetermined reference area A1 can be set as the corresponding area. Also, the user touches the touch input area 22, thereby not only setting the predetermined reference area A1 but also storing the user authentication information. That is, fingerprint information of the user can be also stored. However, since sufficient fingerprint information is required for user authentication, the predetermined reference area A1 must be equal to or greater than an area capable of providing information minimally necessary to perform the user authentication. This is just an example. The user is allowed to set the predetermined reference area A1 and/or the user authentication information in the touch input device 100 in various ways. This set detail can be stored in the memory 120.

As shown in FIG. 13b, a screen for setting the predetermined reference pattern may be displayed on the touch screen 130. In the example shown in FIG. 13b, the user may touch a touch input area 22 of the touch screen 130 in order to set the predetermined reference pattern that he/she wants. Here, the user can adjust the position, direction and/or angle of a finger in order to set his/her desired reference pattern. Specifically, the lower portion of the fingerprint area of the user, which is closer to the palm of the user, may be set as the reference pattern. The reference pattern may be set to include finger joints or may be set to include the side of the finger by adjusting the finger angle. The can hold the touching on the touch input area 22 in a corresponding pattern in order to set his/her own desired pattern as the reference pattern, and then can release the touching. As a result, the predetermined pattern can be set as the corresponding pattern. Also, the user touches the touch input area 22, thereby not only setting the predetermined reference pattern but also storing the user authentication information. That is, fingerprint information of the user can be also stored. However, since sufficient fingerprint information is required for user authentication, the predetermined reference pattern must be able to provide information minimally necessary to perform the user authentication. This is just an example. The user is allowed to set the predetermined reference pattern and/or the user authentication information in the touch input device 100 in various ways. This set detail can be stored in the memory 120.

Although preferred embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch type distinguishing method in a touch input device comprising a touch screen, the touch type distinguishing method comprising:
   a step of determining whether a touch on the touch screen satisfies a predetermined condition of an authorization touch; and
   a touch type determination step of determining a touch type in accordance with whether or not the touch satisfies the predetermined condition of the authorization touch, and a time period for which the touch is maintained,
   wherein the touch type comprises the authentication touch, a long touch and a tap touch,
   wherein the touch type determination step comprises:
   a step of determining the touch as the authentication touch when the touch satisfies the predetermined condition of the authorization touch and the time period for which the touch satisfies the predetermined condition of the authorization touch is equal to or greater than a predetermined reference time period,
   a step of determining the touch as the tap touch when the touch does not satisfy the predetermined condition of the authorization touch and the touch is released prior to the long touch determination criterion time point, and
   a step of determining the touch as the long touch when the touch does not satisfy the predetermined condition of the authorization touch and the time at which the touch is maintained exceeds the long touch determination criterion time point.

2. The touch type distinguishing method of claim 1, further comprising the step of determining the touch as the authentication touch when the touch starts to satisfy the predetermined condition prior to the long touch determination criterion time point and the time period for which the touch satisfies the predetermined condition is equal to or greater than the predetermined reference time period.

3. The touch type distinguishing method of claim 1, wherein the touch type determination step comprises the step of determining the touch as the authentication touch when a condition that the time period for which the touch satisfies the predetermined condition is equal to or greater than the predetermined reference time period is prior to the long touch determination criterion time point.

4. The touch type distinguishing method of claim 1, wherein the touch type determination step comprises the step of determining the touch type in accordance with whether or not the touch satisfies the predetermined condition, the time period for which the touch is maintained, and a pressure applied by the touch, and of determining the touch as the authentication touch when the pressure applied by the touch is less than the predetermined reference pressure until a condition that the time period for which the touch satisfies the predetermined condition is equal to or greater than the predetermined reference time period is satisfied.

5. The touch type distinguishing method of claim 4, wherein the touch type determination step comprises the step of determining the touch as a force touch when the touch is not determined as the authentication touch and the pressure applied by the touch is equal to or greater than the predetermined reference time.

6. The touch type distinguishing method of claim 1, wherein the touch type determination step comprises a step of determining the touch type in accordance with whether or not the touch satisfies the predetermined condition, the time period for which the touch is maintained, and a pressure applied by the touch, and of determining the touch as the authentication touch when the pressure applied by the touch is less than the predetermined reference pressure before the touch starts to satisfy the predetermined condition and when the time period for which the touch satisfies the predetermined condition is equal to or greater than the predetermined reference time period.

7. The touch type distinguishing method of claim 6, wherein the touch type determination step comprises the step of determining the touch as a force touch when the touch is not determined as the authentication touch and the pressure applied by the touch is equal to or greater than the predetermined reference time.

8. The touch type distinguishing method of claim 1, wherein the predetermined condition is at least one of a condition that a touch area of the touch is greater than or equal to a predetermined reference area and a condition that a predetermined reference pattern is recognized from the touch.

9. A touch input device capable of distinguishing touch types, the touch input device comprising:
   a touch screen;
   a touch controller; and
   a processor,
      wherein the controller transmits, to the processor, at least one of a touch position, a touch area, and a touch pressure of a touch input to the touch screen, and a change amount in electrical characteristics by the touch,
      and wherein the processor uses at least one of the touch position, touch area, touch pressure, and change amount in electrical characteristics, which are transmitted from the touch controller, and thus, determines whether the touch satisfies a predetermined condition or not, calculates a time period for which the touch is maintained, and determines a touch type in accordance with whether or not the touch satisfies the predetermined condition, and the time period for which the touch is maintained,
   wherein the touch type comprises an authentication touch, a long touch and a tap touch,
   wherein the processor determines:
   the touch as the authentication touch when the touch satisfies the predetermined condition of the authorization touch and the time period for which the touch maintained the satisfaction of the predetermined condition is equal to or greater than a predetermined reference time period, the touch as the tap touch when the touch does not satisfy the predetermined condition of the authorization touch and the touch is released prior to the long touch determination criterion time point, and the touch as the long touch when the touch does not satisfy the predetermined condition of the authorization touch and the time at which the touch is maintained exceeds the long touch determination criterion time point.

10. The touch input device of claim 9, wherein the processor determines the touch the authentication touch when the touch starts to satisfy the predetermined condition prior to the long touch determination criterion time point and the time period for which the touch maintains the satisfaction of the predetermined condition is equal to or greater than the predetermined reference time period.

11. The touch input device of claim 9, wherein the processor determines the touch as the authentication touch when a condition that the time period for which the touch maintains the satisfaction of the predetermined condition is equal to or greater than the predetermined reference time period is satisfied prior to the long touch determination criterion time point.

12. The touch input device of claim 9, wherein the processor determines the touch type in accordance with whether or not the touch satisfies the predetermined condition, the time period for which the touch is maintained, and the touch pressure, and determines the touch as the authentication touch when a pressure applied by the touch less is than a predetermined reference pressure until a condition that the time period for which the touch maintains the satisfaction of the predetermined condition is equal to or greater than the predetermined reference time period is satisfied.

13. The touch input device of claim 12, wherein the processor determines the touch as a force touch when the touch is not determined as the authentication touch and the pressure applied by the touch is equal to or greater than the predetermined reference time.

14. The touch input device of claim 9, wherein the processor determines the touch type in accordance with whether or not the touch satisfies the predetermined condition, the time period for which the touch is maintained, and a pressure applied by the touch, and determines the touch as the authentication touch when a pressure applied by the touch is less than the predetermined reference pressure before the touch starts to satisfy the predetermined condition and when the time period for which the touch maintains the satisfaction of the predetermined condition is equal to or greater than the predetermined reference time period.

15. The touch input device of claim 14, wherein the processor determines the touch as a force touch when the touch is not determined as the authentication touch and the pressure applied by the touch is equal to or greater than the predetermined reference time.

16. The touch input device of claim 9, wherein the predetermined condition is at least one of a condition that a touch area of the touch is greater than or equal to a predetermined reference area and a condition that a predetermined reference pattern is recognized from the touch.

* * * * *